Feb. 27, 1923.

F. L. BATES.
NUT LOCK.
FILED DEC. 6, 1921.

1,447,056.

WITNESSES
Edw. Thorpe
S. W. Foster

INVENTOR
Finis L. Bates
BY
Munn & Co
ATTORNEYS

Patented Feb. 27, 1923.

1,447,056

UNITED STATES PATENT OFFICE.

FINIS L. BATES, OF MEMPHIS, TENNESSEE.

NUT LOCK.

Application filed December 6, 1921. Serial No. 520,330.

*To all whom it may concern:*

Be it known that I, FINIS L. BATES, a citizen of the United States, and a resident of Memphis, in the county of Shelby and State of Tennessee, have invented a new and Improved Nut Lock, of which the following is a full, clear, and exact description.

This invention relates to improvements in nut locks, and more particularly to an improved arrangement of threads within a nut whereby a portion of the threads of the nut serves to expand or distort threads of a bolt and provide a nut lock without the employment of any third part.

A further object is to improve upon the construction disclosed in Patent No. 156,722, granted to me November 10, 1874.

With these and other objects in view the invention consists in certain novel features of construction and combinations and arrangements of parts, as will be more fully hereinafter described and pointed out in the claims.

In the accompanying drawings—

Figure 1:
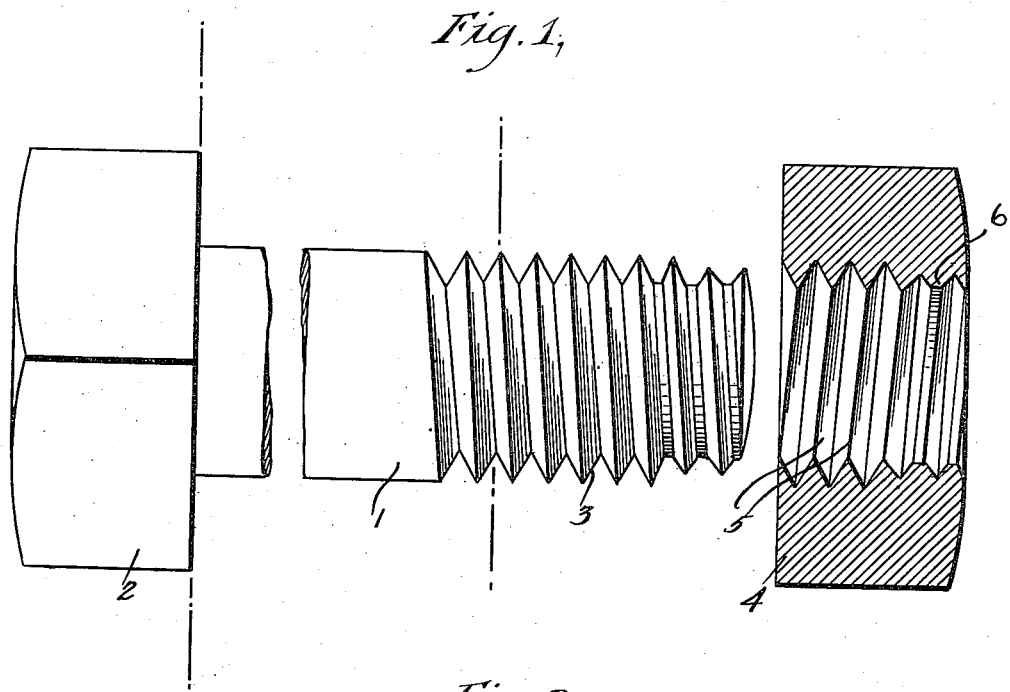
Figure 1 is a view showing the bolt in elevation and my improved nut in longitudinal section.
Figure 2:
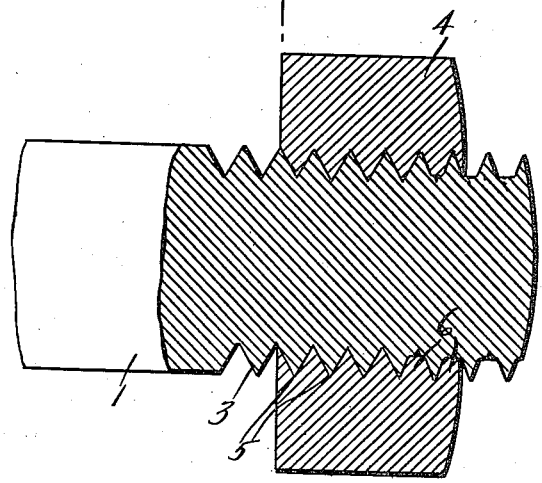
Figure 2 is a view showing the nut and bolt in longitudinal section with the nut in locking position on the bolt.

1 represents a bolt of ordinary construction having a head 2 at one end and provided with screw threads 3 at its other end. 4 represents my improved nut which is provided throughout the greater portion of its length with threads 5 which are of the same pitch as the threads 3 of the bolt, but at the extreme outer end of the nut I provide a truncated thread 6 which is of slightly different pitch and of appreciably less depth than the threads 5 and slightly wider so as to distort or expand the threads 3, as will more fully hereinafter appear.

The purpose of this construction of nut with its arrangement of threads is to provide efficient means for preventing the nuts or screw threaded bolts from working loose by means of jarring, vibration and other causes to which such parts are subjected.

In constructing or threading the nut a special tap is employed. Such a tap will be provided on its entering end with a thread of slightly different pitch less in depth than the other threads throughout its length and of a shape to properly form the expanding or distorting thread 6. Such a tap is passed through the nut and stopped as it reaches the outer end of the nut, thereby cutting standard threads in the nut except at the extreme outer edge thereof.

In operation, the nut can be used for any ordinary purpose and eliminates the use of lock washers, etc. Furthermore, the nut can be unscrewed or backed off after it has been applied to a bolt, due to the fact that the locking thread or threads of the nut will not destroy the threads of the bolt over which it has passed, but will merely operate to expand or distort them sufficiently to form a lock and will, upon withdrawal, function to restore the threads to their original shape.

It is obvious that this form of nut is especially adapted for use in connection with railroads where the nuts are liable to work loose and which may need tightening from time to time, and where a nut of this character will accomplish its purpose without the employment of a separate locking device.

Various slight changes might be made in the general form and arrangement of the parts described without departing from the invention, and hence I do not limit myself to the precise details set forth, but consider myself at liberty to make such changes and alterations as fairly fall within the spirit and scope of the appended claims.

I claim:

1. A nut of the character described, comprising standard threads throughout the greater portion and at its bolt receiving end and having at its outer end a continuing thread or portion of thread which is truncated and of less depth and greater width than the standard threads.

2. In combination with a bolt having standard threads thereon, a nut having standard threads from its entrance end to a point adjacent its rear end and having at its rear end truncated threads of less depth and greater width than the standard threads whereby the threads of the bolt are expanded by the entrance of the threads of the nut thereon.

3. A nut provided with a standard V-thread throughout the greater part of its length and a truncated thread adjacent to its outer end, said truncated thread being less in depth, greater in width and of a slightly different pitch than said standard threads.

FINIS L. BATES.